US010703309B2

(12) United States Patent
Neff et al.

(10) Patent No.: US 10,703,309 B2
(45) Date of Patent: Jul. 7, 2020

(54) METHOD AND DEVICE FOR CONNECTING A DIAGNOSTIC UNIT TO A CONTROL UNIT IN A MOTOR VEHICLE

(71) Applicant: Bayerische Motoren Werke Aktiengesellschaft, Munich (DE)

(72) Inventors: Albrecht Neff, Unterschleissheim (DE); Max Turner, Munich (DE); Lars Voelker, Munich (DE); Thomas Koenigseder, Wilfling (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 141 days.

(21) Appl. No.: 14/821,373

(22) Filed: Aug. 7, 2015

(65) Prior Publication Data
US 2015/0351137 A1 Dec. 3, 2015

Related U.S. Application Data

(63) Continuation of application No. PCT/EP2014/052384, filed on Feb. 7, 2014.

(30) Foreign Application Priority Data

Feb. 8, 2013 (DE) .................... 10 2013 202 064

(51) Int. Cl.
*H04W 76/10* (2018.01)
*B60R 16/03* (2006.01)
(Continued)

(52) U.S. Cl.
CPC ........ *B60R 16/0315* (2013.01); *G07C 5/0808* (2013.01); *H04L 67/12* (2013.01);
(Continued)

(58) Field of Classification Search
CPC ...... G07C 5/0808; H04W 76/02; H04L 67/12; H04L 63/0428; H04L 63/083; B60R 16/0315
See application file for complete search history.

(56) References Cited

U.S. PATENT DOCUMENTS 6,128,560 A * 10/2000 Ishii ..................... G01R 31/007
307/10.1
6,859,718 B2 2/2005 Fritz et al.
(Continued)

FOREIGN PATENT DOCUMENTS

CN 1692034 A 11/2005
CN 101199183 A 6/2008
(Continued)

OTHER PUBLICATIONS

English translation of Chinese-language Office Action issued in counterpart Chinese Application No. 201480007636.7 dated Jul. 5, 2016 (Eight (8) pages).

(Continued)

*Primary Examiner* — Nicholas Sloms
(74) *Attorney, Agent, or Firm* — Crowell & Moring LLP

(57) ABSTRACT

For connecting a diagnostic unit to a vehicle controller of a motor vehicle via a network connection, it is provided that, when the connection has been established between the diagnostic unit and the vehicle controller, a check is performed as to whether the diagnostic unit is directly connected to the vehicle controller. The diagnostic unit receives diagnostic data from the vehicle controller only when there is a direct connection.

9 Claims, 3 Drawing Sheets

(51) Int. Cl.
*H04L 29/08* (2006.01)
*G07C 5/08* (2006.01)
*H04L 29/06* (2006.01)

(52) U.S. Cl.
CPC ......... *H04W 76/10* (2018.02); *H04L 63/0428* (2013.01); *H04L 63/083* (2013.01)

(56) References Cited

U.S. PATENT DOCUMENTS

| | | | |
|---|---|---|---|
| 7,869,920 B2* | 1/2011 | Mark | H04L 12/2803 340/12.3 |
| 2003/0225485 A1* | 12/2003 | Fritz | G06F 21/51 701/1 |
| 2005/0154500 A1 | 7/2005 | Sonnenrein et al. | |
| 2005/0206240 A1 | 9/2005 | Enders et al. | |
| 2009/0212928 A1* | 8/2009 | Aijaz | H04L 63/08 340/426.1 |
| 2010/0049395 A1* | 2/2010 | Duddle | G07C 5/006 701/31.4 |
| 2010/0127824 A1* | 5/2010 | Moschl | G05B 19/4184 340/5.65 |
| 2010/0191410 A1* | 7/2010 | Torlo | H04L 63/12 701/31.7 |
| 2010/0291410 A1 | 11/2010 | Novotny et al. | |
| 2013/0104186 A1 | 4/2013 | Dietz et al. | |
| 2014/0005881 A1* | 1/2014 | Hardesty | F02D 41/22 701/32.8 |

FOREIGN PATENT DOCUMENTS

| | | |
|---|---|---|
| CN | 101518018 A | 8/2009 |
| DE | 102 13 165 B3 | 1/2004 |
| DE | 102 25 786 A1 | 1/2004 |
| DE | 697 29 018 T2 | 4/2005 |
| DE | 603 01 637 T2 | 6/2006 |
| DE | 10 200 5028 663 A1 | 12/2006 |
| DE | 10 2009 027 673 A1 | 1/2011 |
| DE | 10 2010 008 816 A1 | 8/2011 |
| EP | 0 890 109 A1 | 1/1999 |
| EP | 1 346 881 A2 | 9/2003 |
| EP | 1 484 898 A1 | 12/2004 |
| EP | 1 518 383 | 3/2005 |
| JP | 3-229983 A | 10/1991 |
| WO | WO 97/36183 A1 | 10/1997 |
| WO | WO 03/105434 A1 | 12/2003 |
| WO | WO 2005/111752 A1 | 11/2005 |
| WO | WO 2006/133865 A1 | 12/2006 |
| WO | WO 2008/025477 A1 | 3/2008 |

OTHER PUBLICATIONS

International Search Report dated May 8, 2014 with English translation (Six (6) pages).
German Search Report dated Mar. 12, 2013 (Six (6) pages).
Dzhelekarski, P. and Alexiev, D., "Initializing Communication to Vehicl OBDII System", 14th International Conference Electronics' 2005, Sep. 21-23, 2005, Conference Proceedings, Book 3, Sozopol, Bulgaria (Eight (8) pages).
Norm ISO 14230-2: 1999 (E): Road vehicles—Diagnostic systems—Keyword Protocol 2000—Part 2: Data link layer, First edition, Mar. 15, 1999, Geneva, Switzerland (Thirty-four (34) pages).
Norm ISO 9141-3: 1988 (E): "Road vehicles—Diagnostic systems—Part 3: Verification of the communication between vehicle and OBD II scan tool", First edition Dec. 15, 1998, International Organization for Standardization, Geneve, Switzerland (Twenty-three (23) pages).
Dzhelekarski, Peter et al., "Reading and Interpreting Diagnostic Data from Vehicle OBDII System", 14th International Conference Electronics '05, Sep. 21-23, 2005, Conference Proceedings, Book 3, ISBN 954-438-519-3, Sozopol, Bulgaria (Seven (7) pages).
Tanenbaum, Andrew S., Computer Networks 4th Ed., Chapter 8. Network Security, pp. 557-644 (Ninety-eight (98) pages).
Japanese Office Action issued in Japanese counterpart application No. 2015-556503 dated Sep. 6, 2017 (Two (2) pages).

* cited by examiner

METHOD AND DEVICE FOR CONNECTING A DIAGNOSTIC UNIT TO A CONTROL UNIT IN A MOTOR VEHICLE

CROSS REFERENCE TO RELATED APPLICATIONS

This application is a continuation of PCT International Application No. PCT/EP2014/052384, filed Feb. 7, 2014, which claims priority under 35 U.S.C. § 119 from German Patent Application No. 10 2013 202 064.3, filed Feb. 8, 2013, the entire disclosures of which are herein expressly incorporated by reference.

BACKGROUND AND SUMMARY OF THE INVENTION

The invention relates to a method and an apparatus for connecting a diagnostic unit to a controller in a motor vehicle. The invention relates particularly to the connection of a diagnostic unit to a controller in the form of a network connection.

Motor vehicles today contain a multiplicity of controllers that are connected to one another via data buses. The data buses provided may be networkable buses, in particular, such as a controller area network (CAN) bus or a bus based on the Ethernet or IP standard.

For the purpose of analysis and diagnosis for the controllers and other electronic components of a motor vehicle it is possible for recordings of the data transmitted via the respective associated bus to be made in the form of what is known as a data logging, for example. The data can then be evaluated directly by the vehicle manufacturer, in a service organization or in a repair workshop, for example. To this end, data packets sent via the respective data bus are read by a reader connected thereto and recorded. In this case, the bus data that are read can be stored or mirrored particularly in suitable memories on a local data logger or a central, peripheral, or mobile computer temporarily or permanently, and in part or in full. In the text that follows, the term diagnosis data covers all data sent on buses from controllers or from the diagnostic unit and hence also data that are not produced explicitly for diagnostic purposes, but rather are interchanged among the controllers during normal operation of the vehicle too, for example.

With regard to the reading of bus data, a vehicle diagnostic system having an appropriate standardized plug connection has been standardized under the name on-board diagnosis (OBD). This interface can be used not only to transmit data from the respective buses to a diagnostic unit but also to send data from the outside to the data buses of the vehicle. By way of example, DE 10 2009 027 673 A1 describes the use of an interface connector based on the OBD standard.

In the event of full reading or logging of bus data from a vehicle, a very large volume of data can arise, for example if full operating data are regularly requested by a multiplicity of controllers that are involved in the course of vehicle operation. In addition, particularly when operating data are transmitted from Ethernet buses to a diagnostic unit, the problem can arise that data packets from the Ethernet bus enter a further Ethernet or IP network to which the diagnostic unit or a vehicle-based controller is additionally connected. By way of example, this may be a company network like an intranet for the repair workshop, the service provider or the vehicle manufacturer, or else an Internet connection that exists in the vehicle. When Ethernet data packets enter such a network, this can result in disruption or even collapse of the further Ethernet network, e.g. on account of the large flood of data or on account of colliding data packet conventions or contents when bus data are read for diagnostic purposes.

It is an object of the invention to prevent data packets of the diagnosis data from unintentionally entering a further network to which the controller or the diagnostic unit is connected when transferring diagnosis data from a vehicle controller situated in a motor vehicle to a diagnostic unit.

This and other objects are achieved in accordance with embodiments of the invention.

According to the invention, for the purpose of connecting a diagnostic unit to a vehicle controller in a motor vehicle via a network connection there is provision for a connection setup between the diagnostic unit and the vehicle controller to prompt performance of a check to determine whether the diagnostic unit is directly connected to the vehicle controller and for the diagnostic unit to be provided with diagnosis data from the vehicle controller only when the connection has been made directly.

The effect that can be achieved by the invention is that from the point of view of the motor vehicle it is established whether the vehicle is connected to the diagnostic unit directly or indirectly, for example via one or more other network components. In this case, the invention is based on the insight that a check to determine whether a direct or indirect connection of this kind is made is possible with a feasible amount of effort. Secondly, it has been identified that the effort is justified by the advantage that another network, to which the diagnostic unit and/or the vehicle controller is additionally connected, for example, does not have its operation disrupted by the transmission of diagnosis data between vehicle controller and diagnostic unit in large quantity and with possibly disruptive data packets. The invention can also prevent erroneous or improper actuation of the vehicle controller for the output of diagnosis data while the vehicle or vehicle controller is connected to another network. This also allows the prevention of damage occurring on such other network as a result of unauthorized loading of diagnosis data.

The invention can also achieve the effect that the vehicle controller is not connected to a further network or networkable unit situated outside the vehicle via the same network connection. The invention can be used particularly advantageously if the network connection is an Ethernet connection, a wireless local area network (WLAN) connection or another wireless connection that is used to transmit Ethernet packets.

A direct connection or network connection between vehicle controller and diagnostic unit within the context of the invention can be distinguished by one or more of the following properties, for example:

the connection is not made by way of another network,
the network connection contains only a prescribed configuration of coupling elements (switches), for example:
a) only a prescribed number or maximum number n of switches (n>=0),
b) only registered switches,
c) only switches that forward only prescribed switching commands, for example only prescribed bridge protocol data units (BPDUs), if the network is an Ethernet network, and do not forward other switching commands, and/or
d) only switches that have a particular configuration, e.g. for virtual local area networks (VLANs), port forwarding or other switch mechanisms.

the network connection contains only subscribers having prescribed Internet Protocol (IP) addresses and/or media access control (MAC) addresses. As soon as subscribers having other IP or MAC addresses send data via the network connection, the connection or network connection is no longer deemed to be direct.

A direct connection between vehicle controller and diagnostic unit can be set up particularly by way of an access unit connected between the vehicle controller and the diagnostic unit, in the case of which the access unit has a switching device that sets up a point-to-point connection between vehicle controller and diagnostic unit such that only prescribed but no further network components engage in the communication on the network connection.

In a first preferred exemplary embodiment of the invention, the vehicle controller outputs diagnosis data to the diagnostic unit only when the connection has been made directly. In a second preferred exemplary embodiment of the invention, the diagnostic unit and the vehicle controller have an access unit connected between them, said access unit nevertheless being able to be used to set up a direct connection between diagnostic unit and vehicle controller within the context of the invention. In this exemplary embodiment, the vehicle controller outputs diagnosis data to the access unit. However, the access unit forwards the diagnosis data to the diagnostic unit only if the connection between the latter and the vehicle controller has been made directly, within the context of the invention. On the other hand, the connection is not deemed to be direct and the access unit does not forward the diagnosis data to the diagnosis data if the access unit is connected via the network connection to at least one network component that is independent of the diagnostic unit and/or that is not authorized, particularly to a multiplicity of network components that are independent of the diagnostic unit. The network components may particularly be switches and/or components that are addressable using a network address, for example ports, routers or servers or other components of a computer network.

By way of example, the diagnostic unit may be a personal computer, a laptop or a data logger that sets up the connection to a diagnostic computer and/or stores the diagnosis data in a dedicated memory. In the diagnostic unit, the transmitted and possibly stored diagnosis data can be processed using appropriate computer programs, in particular can be displayed, can be analyzed and/or data derived therefrom can be produced.

The invention particularly provides checking or verification mechanisms that can be used to ensure that there is a direct connection between vehicle controller and diagnostic unit. The checking or verification mechanisms can include measures in one or more layers of a network connection, for example in the physical layer, the data link layer or the network layer according to the Open Systems Interconnection (OSI) reference model.

According to a first checking or verification mechanism, the starting point for which is the physical layer of the network connection, for example, at least one characteristic of the physical layer, particularly the transmission rate, between the network interfaces of the diagnostic unit, the vehicle controller and/or the access unit (if present) is changed over to prescribed values in a prescribed temporal sequence. Full communication between vehicle controller and diagnostic unit is enabled only when the vehicle controller and/or the access unit (if present) receives the prescribed sequence. In this case, the diagnostic unit and/or the access controller (if present) changes over the data transmission rate between the respective network interfaces to prescribed values in a prescribed temporal sequence in the course of connection setup. The vehicle controller and/or the access controller (if present) enables full communication with the diagnostic unit only when it receives the prescribed sequence and can validate it in accordance with its stored check parameters.

According to a second checking or verification mechanism, the starting point for which is a higher-level layer of the network connection, for example the data link layer (layer 2, Ethernet) or the network layer (layer 3, IP), verification additionally involves communication data being interchanged between the diagnostic unit and the vehicle controller with prescribed contents and/or according to prescribed communication rules. By way of example, provision may be made for prescribed BPDU data packet contents and/or data packets having prescribed network addresses, particularly having multicast addresses, to be interchanged.

The contents or communication rules can be designed such that they are normally not forwarded by network switches, i.e. they arrive at the respective destination unit only when the connection between diagnostic unit and vehicle controller exists directly without the interposition of network switches, particularly of regular network switches. By way of example, the access unit then sends diagnosis data to the diagnostic unit via the network connection only if it has previously received a BPDU data packet that has been transmitted by the diagnostic unit and that, according to its type, is not forwarded by the network switches.

The contents or communication rules can also be designed such that the vehicle controller terminates output of diagnosis data immediately if it contains, via the network connection, data packets that, on the basis of their content or on the basis of the form of communication, come from interposed network switches, i.e. they have not been transmitted to the vehicle controller directly by the diagnostic unit.

In addition to the check to determine whether there is a direct network connection, a cryptographic authorization check can take place before and/or during the transmission of the diagnosis data. To this end, vehicle controller and diagnostic unit can each have an encryption and decryption routine (cryptography routine) that is used to encrypt and/or decrypt data transmitted via the network connection, and/or other authentication mechanisms, for example a signature-based mechanism, a challenge/response method or a method based on the IEEE 802.1X standard for authenticating units in a network.

In one advantageous embodiment of the invention, the diagnostic unit or a connecting device connected between the diagnostic unit and the vehicle controller has a first network port for the connection between diagnostic unit and vehicle controller and a second network port of the same network type for the connection to further network units. The network type may be Ethernet, for example. However, the network ports may be of various type, e.g. the first network port may be wired and the second wireless and particularly a WLAN port. In this case, the second network port is at least temporarily physically or functionally isolated from the first network port such that while there is a communication connection between diagnostic unit and vehicle controller via the first network port, it is not possible for the diagnostic unit and/or the vehicle controller to simultaneously communicate via the second network port. The temporary physical or functional isolation may be of switchable design. Further network units that may be provided are particularly routers, servers, clients, switches, etc., from a larger network, for example a company network.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
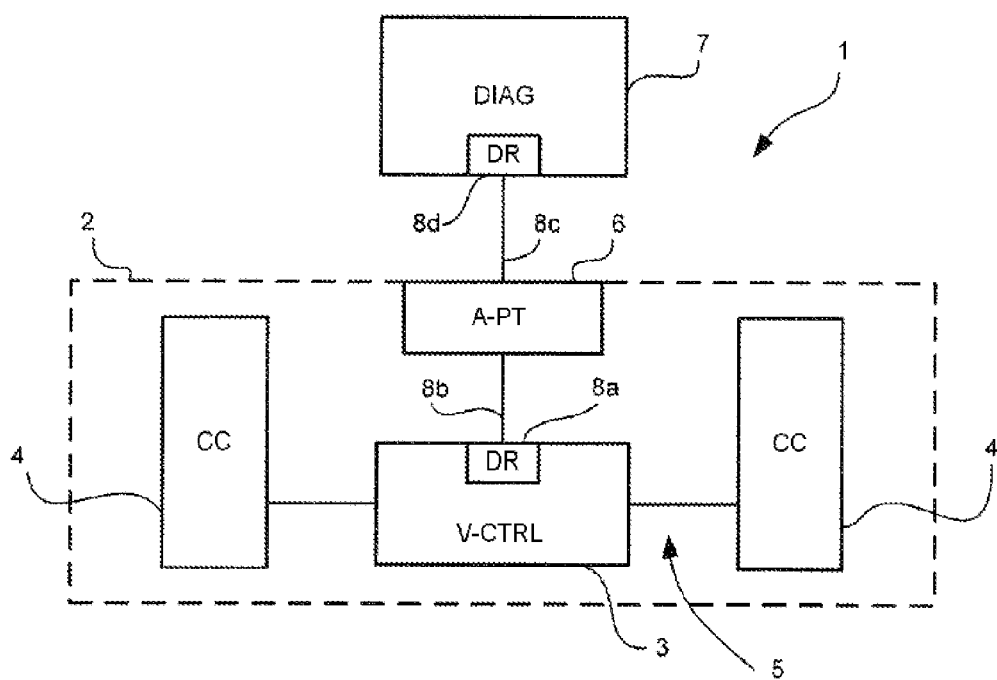
FIG. 1 is a schematic block diagram showing a vehicle with a connected diagnostic device.

In the configuration 1 shown in FIG. 1, a motor vehicle 2 has a diagnostic unit 7 connected to it that can be used to record diagnosis data that are output by the motor vehicle 2 (data logging). The diagnosis data are provided in the motor vehicle 2 by a vehicle controller 3 that, to this end, again receives appropriate data from different component controllers 4 via a vehicle internal data network 5, for example via a CAN bus. On the one hand, the diagnosis data can be transmitted from the vehicle controller 3 to the diagnostic unit 7. Conversely, it is also possible for particular data to be transmitted from the diagnostic unit 7 to the vehicle controller 3. This transmission can take place in response to received data.

The vehicle controller 3 contains an Ethernet network interface having an Ethernet network driver 8a. From the vehicle controller 3, a network cable 8b is routed to an access point 6, e.g. a network socket, to which an Ethernet network cable 8c is in turn connected that sets up the network connection to the diagnostic unit 7. The network connection between the vehicle controller 3 and the diagnostic unit 7 can be implemented not only as an Ethernet network cable but also as a wireless network connection (WLAN), as a Bluetooth connection or using another wireless and/or radio transmission technology, for example.

For the communication with the vehicle controller 3, the diagnostic unit 7 has a corresponding network driver 8d. After the cable 8c is plugged into the access point 6, access by the diagnostic unit 7 to the vehicle controller 3 is activated by way of an instruction command, and communication via the network drivers 8a, 8d is started.

Figure 2:
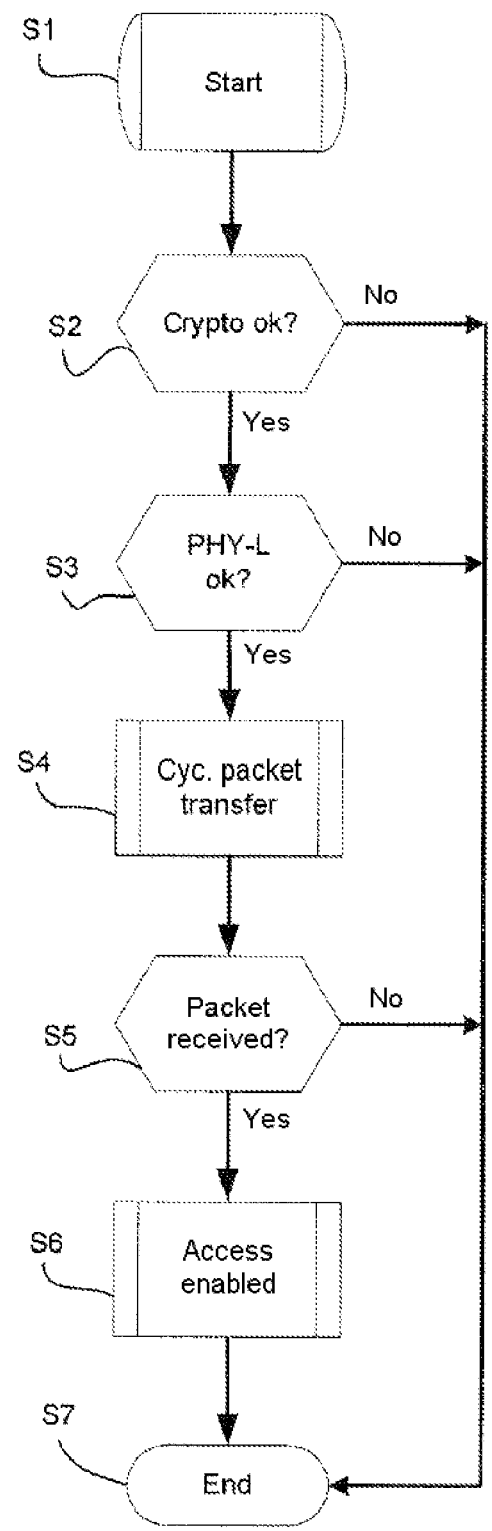
FIG. 2 is a flow chart showing a sequence for the transmission of diagnosis data.

FIG. 2 shows the further sequence of communication. After the start of communication in a step S1, an authentication step S2 cryptographically checks or verifies whether the diagnostic unit 7 is authorized to communicate with the vehicle controller 3. To this end, the vehicle controller 3 expects the diagnostic unit 7 to send a prescribed key to the vehicle controller 3. If this is not the case, communication is terminated by the vehicle controller 3 (step S7). If the correct key is received by the vehicle controller 3, communication is continued and in step S3 further verification for the communication between vehicle controller 3 and diagnostic unit 7 takes place in the physical layer of the Ethernet network connection. To this end, the network driver 8d in the diagnostic unit 7 switches the data rate of the Ethernet data access to and fro between the different transmission speeds, e.g. between 100 MBit/s and 10 MBit/s, according to a prescribed time pattern, e.g. every second. The changeover of the transmission speed is expected and checked by the vehicle based network driver 8a. Only if it detects changeover according to the prescribed time pattern is it possible for the network connection between vehicle controller 3 and diagnostic unit 7 to be enabled as a direct connection and for the process to move to step S4. If the diagnostic unit 7 were not connected to the vehicle controller 3 directly in a network, but rather via interposed network elements such as switches, routers or servers, and if the diagnostic unit 7 were to change over the transmission speed in this case, the vehicle controller 3 would not identify this, since a link that is a great distance from the vehicle controller 3 in network terms would be changed. Hence, the vehicle controller 3 or the network driver 8a would not enable data access and would terminate communication (step S7).

In steps S4 and S5, a further check takes place to determine whether there is a direct connection between vehicle controller 3 and diagnostic unit 7. To this end, the diagnostic unit 7 sends a BPDU data packet having the multicast destination address 01 80 C2 00 00 01 to the vehicle controller 3 cyclically every second in step S4. In step S5, the vehicle controller 3 checks whether the BPDU data packet has arrived. A BPDU data packet of this type would not be forwarded in an ordinary Ethernet network, connected between diagnostic unit 7 and vehicle controller 3, by the switches of said network. Reception of this BPDU data packet therefore likewise signals to the vehicle controller 3 that there is a direct connection to the diagnostic unit 7. Only if the checks in steps S3 and S5 yield positive results is access by the diagnostic unit 7 to the vehicle controller 3 enabled in step S6 in order to read the diagnosis data from the vehicle controller 3.

If access by the diagnostic unit 7 to the vehicle controller 3 is enabled, the network connection continues to be monitored for events that could endanger correct transmission of the diagnosis data or that indicate that the network connection is no longer a direct connection. The monitoring preferably takes place in the vehicle controller 3. In the event of an error, the vehicle controller 3 stops the transmission of the diagnosis data immediately, particularly for the following events:

In the case of a link down, i.e. when the network connection is temporarily or completely interrupted in the physical layer;

In the case of a reset or a standby state for the diagnostic unit 7;

If the vehicle controller 3 receives Ethernet data packets, particularly BPDU packets having a network address (MAC address), that cannot be attributed to the diagnostic unit 7 or that do not correspond to the relevant addressees stored in the vehicle controller 3. Examples of such BPDU packets are Spanning Tree Protocol (STP) packets or Cisco Discovery Protocol (CDP) packets or packets having the multicast destination addresses 01 80 C2 00 00 xx (with xx: 00, 02 . . . 0F), which are typically used as messages for setting up network structures in a network having a multiplicity of network subscribers.

Figure 3:
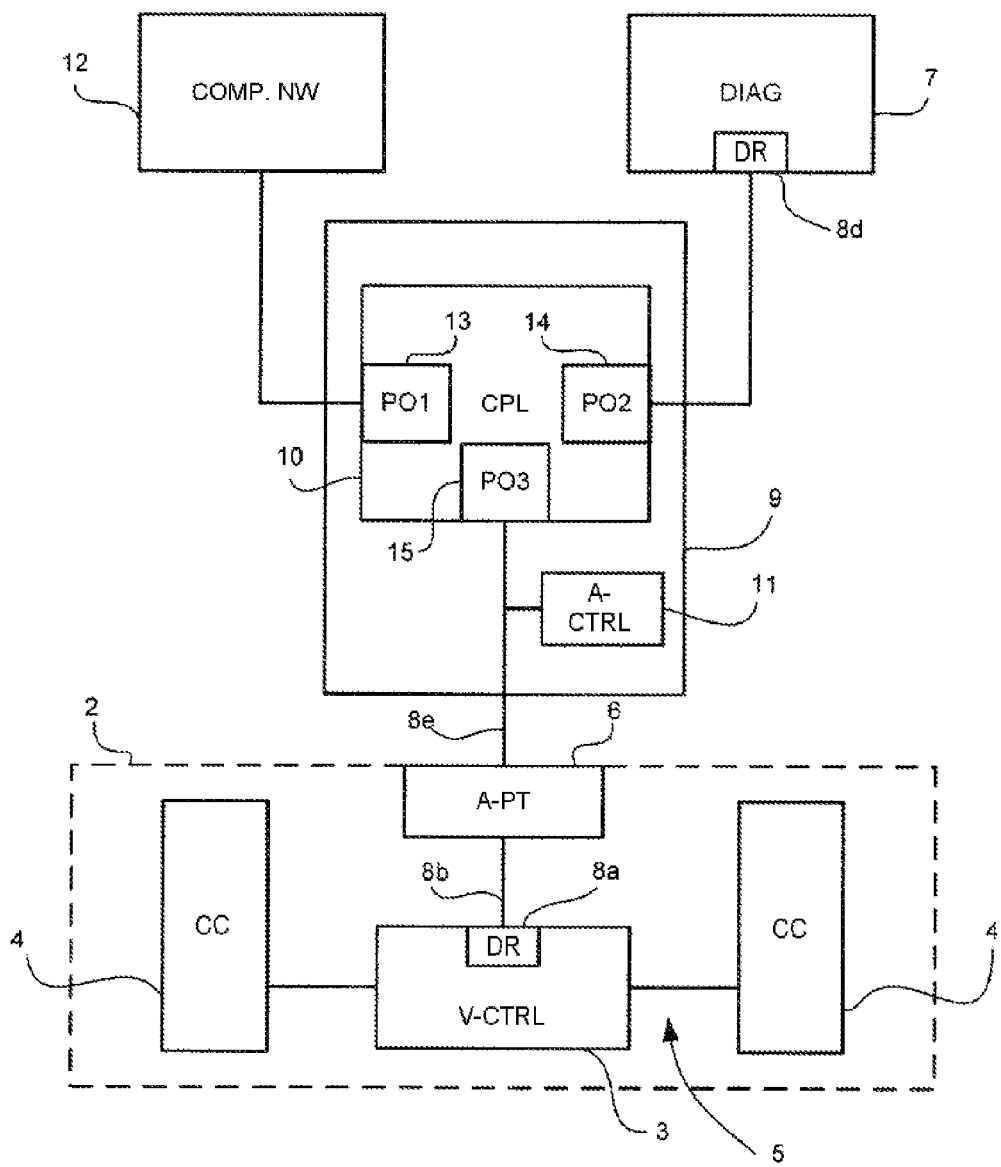
FIG. 3 is a schematic block diagram showing a vehicle with a diagnostic device connected via an access unit.

FIG. 3 shows an alternative configuration to FIG. 1 for a motor vehicle 2 with a connected diagnostic device. In this case, the connection between vehicle controller 3 and diagnostic unit 7 is set up via a diagnosis access unit 9 that is directly connected to the access point 6 of the motor vehicle 2 by way of a line 8e. The diagnosis access unit has an access controller 11 that can be used to perform the measures described with reference to FIG. 1 for enabling the transmission of the diagnosis data. In a first embodiment of the access controller 11, the measures of the vehicle controller 3 that are described in FIG. 1 can be performed, particularly the enabling of the transmission of the diagnosis data from the vehicle controller 3 to the diagnostic unit 7. By way of example, this can be effected if the diagnostic unit 7 cyclically changes over the transmission speed of the network connection, in the case in FIG. 3 the transmission speed of the network connection between diagnostic unit 7 and diagnosis access unit 9. Alternatively or additionally, the diagnosis access unit 9 can send diagnosis data to the diagnostic unit 7 via the network connection only when it has previously received a BPDU data packet that has been transmitted by the diagnostic unit 7 and that, in accordance with its type, is not forwarded by the network switches.

In a second embodiment of the access controller 11, the access controller can prompt the measures of the diagnostic unit 7 that are described in FIG. 1, particularly the cyclic changeover of the transmission speed of the network connection from the diagnosis access unit 9 to the access point 6. As a result, the effect that can be achieved with the access controller 11 is that the vehicle controller 3 enables or activates the data interface and diagnosis data are transmitted directly to the diagnostic unit 7 via the coupling arrangement 10 of the diagnosis access unit 9. In this case too, it is alternatively or additionally possible to provide for the diagnosis access unit 9 to send or forward diagnosis data to the diagnostic unit 7 via the network connection only when it has previously received a BPDU data packet that has been transmitted by the diagnostic unit 7 and that, in accordance with its type, is not forwarded by the network switches.

The coupling arrangement 10 can be implemented as a filter and/or switching apparatus and particularly in the form of a network switch arrangement. The coupling arrangement 10 can be used to set up network connections, in each case via ports 13, 14, 15, between the vehicle controller 3, the diagnostic unit 7 and a larger company network 12. In addition, the access controller 11 can be used to set the coupling arrangement 10 such that a direct network connection is set up between vehicle controller 3 and company network 12. For diagnosis and/or recording of vehicle diagnosis data by way of the diagnostic unit 7, the connection between vehicle controller 3 and company network 12 via the ports 13 and 15 is disabled, however. This firstly allows the provision of control access to the motor vehicle 2 via the company network 12, for example, for the purpose of loading firmware updates into the vehicle controller 3 and/or into the component controllers 4. Secondly, it is possible for data transmission that is shielded from the company network 12 to be performed between vehicle controller 3 and diagnostic unit 7 and in so doing for the company network 12 to be reliably protected against being flooded with diagnosis data from the vehicle controller 3, for example.

It is clear that if a direct network connection is set up between vehicle controller 3 and diagnostic unit 7 as a point to point connection that is physically isolated (or isolated for control purposes) from the company network 12 then connection setup between vehicle controller and diagnostic unit 7 can take place directly as described above with reference to FIG. 1. The diagnosis access unit 9 can use the coupling arrangement 10 to set up a direct point to point network connection between vehicle controller 3 and diagnostic unit 7 such that only authorized network components, particularly the ports 14, 15, engage in the communication on the network connection, but no further network components, particularly not the port 13 and no components of the company network 12.

A series of measures have been described for setting up a direct network connection between a vehicle controller and a diagnostic unit so that smooth interchange of diagnosis data is possible. These have firstly involved an indication of measures for checking the network connection in the course of its setup. Secondly, measures for monitoring the network connection after it has been set up have been indicated. It is possible for further measures to be provided. By way of example, before the network connection is set up, the vehicle controller can check what type of unit is connected to the network port. If, by way of example, a network component that contains an active wireless connection (WLAN) is connected, provision may be made for access to be disabled in principle. Before or during activation of the data access, the vehicle controller can actively seek specific network components that are known beforehand and cannot be combined with a direct network connection to the diagnostic unit, for example the DHCP server in a previously known company network. If such network components are found, access to the vehicle controller can likewise be disabled in principle. With reference to FIG. 2, it would be possible to check even before step S2 whether there is a legally relevant OBD diagnostic session. In order to safeguard the verification of a direct connection between diagnostic unit and vehicle controller even further, it would be possible, if the access line from the diagnostic unit to the vehicle is an OBD line, for the diagnostic unit to put the OBD activation line at high and low levels in a particular pattern in order to signal that the diagnostic unit is connected directly. Parallel signaling via an additional data bus (e.g. CAN bus) installed in the access would likewise be conceivable in order to use the data bus to signal that the connection is direct.

The units and system components described are controlled particularly by way of computer programs and, to this end, can have further, inherently known elements of computers and digital control devices such as a microprocessor, volatile and nonvolatile memories, interfaces, etc. Therefore, the invention can also be implemented wholly or in part in the form of a computer program product that prompts a sequence according to the invention wholly or in part when loaded and executed on a computer. It can be provided in the form of a data storage medium like a CD/DVD, for example, or else in the form of one or more files on a server from which the computer program can be downloaded.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for communicatively connecting a diagnostic unit to a vehicle controller in a motor vehicle via a network, the method comprising:
   upon setting up a network connection between the diagnostic unit and the vehicle controller via the network, determining that a network connection condition exists, wherein the network connection condition is that the diagnostic unit is communicatively connected to the vehicle controller via the network connection such that the vehicle controller is not also communicatively connected through the network connection to a further network or networkable unit situated outside the vehicle, wherein the diagnostic unit, or a connecting device connected between the diagnostic unit and the vehicle controller, has a first network port for connection between the vehicle controller and the diagnostic unit and has a second network port of a same network type for connection to further network units;

in response to determining that the network connection condition exists, providing, through the network connection, the diagnostic unit with diagnosis data from the vehicle controller;

otherwise not outputting diagnosis data from the vehicle controller through the network connection;

verifying, during the network connection setup, that the diagnostic unit changes over a characteristic of a physical connection between network interfaces of the vehicle controller and the diagnostic unit between prescribed values of the characteristic and in accordance with a prescribed temporal sequence; and at least temporarily physically or functionally isolating the second network port from the first network port such that, while there is a communication connection between the diagnostic unit and the vehicle controller via the first network port, it is not possible for the diagnostic unit and/or the vehicle controller to simultaneously communicate via the second network port, wherein the connecting device and/or the vehicle controller enables full communication only if the vehicle controller detects the characteristic of the physical connection was changed between the prescribed values in the prescribed temporal sequence, and wherein said verifying comprises verifying, during the network connection set up between the diagnostic unit, the connecting device and/or the vehicle controller, that a characteristic of the physical connection between network interfaces of the diagnostic unit the connecting device, and/or the vehicle controller, is changed between prescribed values of the characteristic in a prescribed temporal sequence.

2. The method according to claim 1, wherein the characteristic of the physical connection is a transmission rate.

3. The method according to claim 1, wherein the verifying comprises interchanging communication data between the diagnostic unit and the vehicle controller, said communication data having prescribed contents and/or said interchanging being according to prescribed communication rules.

4. The method according to claim 1, wherein the network connection is an Ethernet connection, a WLAN connection, or another wireless connection used to transmit Ethernet packets.

5. The method according to claim 1, wherein a network switch is connected between a network interface of the diagnostic unit and a network interface of the vehicle controller, said network switch selectively connecting the diagnostic unit either to the vehicle controller or to at least one other network unit.

6. A unit, comprising:
a microprocessor configured to execute a computer program stored on a non- transitory computer readable medium, said computer program executing a method to:
upon setting up a network connection between a diagnostic unit and a vehicle controller via a network, determine that a network connection condition exists, wherein the network connection condition is that the diagnostic unit is communicatively connected via the network connection to the vehicle controller such that the vehicle controller is not also communicatively connected through the network connection to a further network or networkable unit situated outside the vehicle, wherein the diagnostic unit, or a connecting device connected between the diagnostic unit and the vehicle controller, has a first network port for connection between the vehicle controller and the diagnostic unit and has a second network port of a same network type for connection to further network units;

in response to determining that the network connection condition exists, provide, through the network connection, the diagnostic unit with diagnosis data from the vehicle controller;

otherwise not output diagnosis data from the vehicle controller through the network connection;

verify, during the network connection setup, that the diagnostic unit changes over a characteristic of a physical connection between network interfaces of the vehicle controller and the diagnostic unit between prescribed values of the characteristic and in accordance with a prescribed temporal sequence; and at least temporarily physically or functionally isolate the second network port from the first network port such that, while there is a communication connection between the diagnostic unit and the vehicle controller via the first network port, it is not possible for the diagnostic unit and/or the vehicle controller to simultaneously communicate via the second network port, wherein the connecting device and/or the vehicle controller enables full communication only if the vehicle controller detects the characteristic of the physical connection was changed between the prescribed values in the prescribed temporal sequence, and wherein said verifying comprises verifying, during the network connection set up between the diagnostic unit, the connecting device and/or the vehicle controller, that a characteristic of the physical connection between network interfaces of the diagnostic unit the connecting device, and/or the vehicle controller, is changed between prescribed values of the characteristic in a prescribed temporal sequence.

7. The unit according to claim 6, wherein the unit is a diagnostic unit.

8. The unit according to claim 6, wherein the unit is an access unit.

9. A motor vehicle, comprising:
a vehicle controller configured to execute a computer program stored on a non- volatile, non-transitory computer readable medium to:
upon setting up a network connection between a diagnostic unit and the vehicle controller via a network, determine that a network connection condition exists, wherein the network connection condition is that the diagnostic unit is communicatively connected via the network connection to the vehicle controller such that the vehicle controller is not also communicatively connected through the network connection to a further network or networkable unit situated outside the vehicle, wherein the diagnostic unit, or a connecting device connected between the diagnostic unit and the vehicle controller, has a first network port for connection between the vehicle controller and the diagnostic unit and has a second network port of a same network type for connection to further network units;

in response to determining that the network connection condition exists, provide, through the network connection, the diagnostic unit with diagnosis data from the vehicle controller;

otherwise not output diagnosis data from the vehicle controller through the network connection;

verify, during the network connection setup, that the diagnostic unit changes over a characteristic of a physical connection between network interfaces of the vehicle controller and the diagnostic unit between prescribed values of the characteristic and in accordance with a prescribed temporal sequence; and at least temporarily physically or functionally isolate the second network port from the first network port such that, while there is a communication connection between the diagnostic unit and the vehicle controller via the first network port, it is not possible for the diagnostic unit and/or the vehicle controller to simultaneously communicate via the second network port, wherein the connecting device and/or the vehicle controller enables full communication only if the vehicle controller detects the characteristic of the physical connection was changed between the prescribed values in the prescribed temporal sequence, and wherein said verifying comprises verifying, during the network connection set up between the diagnostic unit, the connecting device and/or the vehicle controller, that a characteristic of the physical connection between network interfaces of the diagnostic unit the connecting device, and/or the vehicle controller, is changed between prescribed values of the characteristic in a prescribed temporal sequence.

* * * * *